United States Patent [19]
Kraske

[11] Patent Number: 4,738,580
[45] Date of Patent: Apr. 19, 1988

[54] SALES STAND FOR SEWING THREAD BOBBINS AND THE LIKE

[75] Inventor: Bernhard Kraske, Gutach, Fed. Rep. of Germany

[73] Assignee: Gütermann & Co. AG, Zurich, Switzerland

[21] Appl. No.: 852,429

[22] Filed: Apr. 16, 1986

[30] Foreign Application Priority Data

Apr. 17, 1985 [DE] Fed. Rep. of Germany ....... 3513734

[51] Int. Cl.$^{4}$ .................................................. B65G 1/06
[52] U.S. Cl. ........................................ 414/269; 312/72; 312/211; 414/225; 414/276; 901/21
[58] Field of Search ................ 221/192; 414/276, 273, 414/272, 269, 222, 225; 312/211, 45, 72; 901/21

[56] References Cited

U.S. PATENT DOCUMENTS

| | | | |
|---|---|---|---|
| 4,243,145 | 1/1981 | Woodhead | 312/72 X |

FOREIGN PATENT DOCUMENTS

| | | | |
|---|---|---|---|
| 72141 | 2/1983 | European Pat. Off. . | |
| 1175155 | 7/1964 | Fed. Rep. of Germany | 414/276 |
| 1474748 | 5/1969 | Fed. Rep. of Germany . | |
| 1554664 | 3/1970 | Fed. Rep. of Germany . | |
| 3301905 | 7/1984 | Fed. Rep. of Germany . | |
| 115503 | 9/1980 | Japan | 414/276 |

*Primary Examiner*—Leslie J. Paperner
*Assistant Examiner*—Stuart J. Millman
*Attorney, Agent, or Firm*—Baker, Maxham & Jester

[57] ABSTRACT

The sales stand for sewing thread bobbins and the like consists of a housing which is divided into an upper customer array part and a lower equipment part arranged beneath it in which the customer array consists of storage slots arranged in rows and columns with their longitudinal axes parallel where each slot has a removal opening at the front and a filling opening at the back, and in each slot a number of the same bobbins are arranged which can be removed from the removal opening at the front. Magazines for each diameter of bobbin are arranged in the equipment part from which the transport system automatically refills the storage slots. An XY transport system is provided for the filling of the slots through the rear filling openings which works parallel to the plane of the filling openings and which consists of a bobbin lift accepting in each case at least one bobbin and which is drivable in the Y-direction, and which is slidably mounted in a carriage which is drivable in the X-direction, with the provision of an XY transport system, the depth of the housing is only slightly enlarged whereas the height of the housing can remain unchanged.

12 Claims, 9 Drawing Sheets

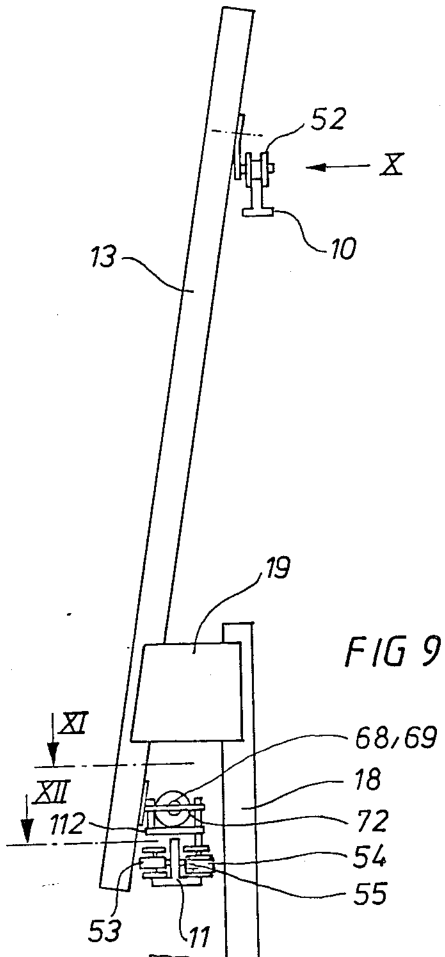
FIG 9
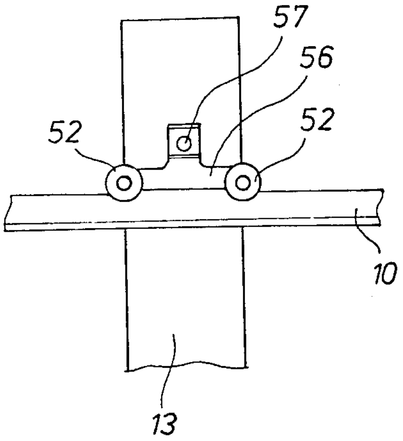
FIG 10
FIG 11
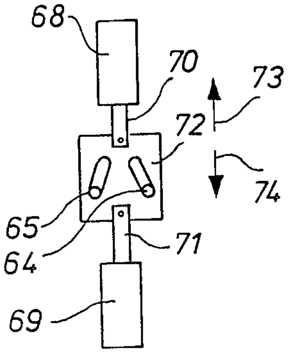
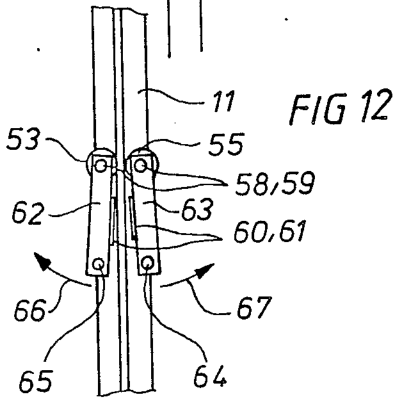
FIG 12

SALES STAND FOR SEWING THREAD BOBBINS AND THE LIKE

BACKGROUND OF THE INVENTION

The invention concerns a sales stand according to the preamble of patent claim 1.

Such a sales stand is known for example by EP 72141 A3 from the same applicant. A sales stand of this type serves for the storage of a large amount of sewing-thread bobbins in which the sewing-thread bobbins are differentiated with regard to diameter, thread colour, thread length and thread strength. The sales stand consists, in the known fashion, of a number of storage slots arranged in rows and columns in which each storage slot has a removal opening at the front end and, as required, a filling opening at the back. Each storage slot contains only one sort of sewing cotton.

The storage capacity of such a storage slot is preferably large enough to accept a quantity of about 10 to 12 bobbins.

In the case of a sales stand in accordance with EP 72141 A3 the filling of the storage slots was undertaken from the front side of the equipment. Removal and filling openings were therefore identical. The filling of the storage slots was carried out by hand which required an unusually high work load.

The sales stand according to EP 72141 A3 already fulfils an important requirement on which is based the sales stand according to the present invention. Such sales stands are set up in shops and the housing must not exceed a specific height of, for example, 1.60 m in order to ensure that when set up in a shop the sales stand does not obscure the view of the other goods arranged behind it. A further important requirement in addition to the limiting of the height of the housing is the limiting of the depth of the housing. Up to now such sales stands have been permitted only for reasons of the filling by hand because a mechanized filling required either a too high or too wide housing.

The invention is therefore based on the technical problem of the further development of a sales stand of the type mentioned in the introduction so that an automatic refilling of the storage slots with bobbins wound with sewing thread is possible in a housing of the smallest possible dimensions.

BRIEF SUMMARY OF THE INVENTION

To solve the problem posed the invention is characterized in that for the automatic filling of the storage slots through the rear filling openings an XY transport system is provided working parallel to the plane of the filling openings and which consists of a bobbin lift accepting in each case at least one bobbin and which is drivable in the Y-direction and which is slidably mounted in a carriage which is drivable in the X-direction.

An essential feature of the present invention is therefore, that the storage slots from rear filling openings and that parallel to the plane of the filling openings, a transport system working in X and Y directions is arranged, which, in conjunction with a drive and an optical reading system, can be positioned so that in any optional place in the row-and-column arranged filling openings a bobbin can be inserted into the storage slot.

The storage slots are preferably sloped forwards in the direction of the front removal slot, so that the bobbin inserted into the rear filling opening rolls forwards in the direction of the front removal opening and can be removed by the customer.

An advantage of the rear filling of the storage slots is also that the first bobbin inserted is also the first bobbin to be removed thus ensuring that the bobbins have no long storage time on the storage slot.

In the case of a front filling of the storage slots the first to be inserted was also the last to be removed which leads to long storage times of the initially-inserted bobbin.

An essential feature of the XY-transport system is therefore that the height of the sales stand housing is not increased and the depth of the sales stand is only slightly increased. Thus an optimal placing of the automatic-filling system is achieved, as described in the following:

The housing of the sales stand is divided into an upper customer array part at hand height and a lower equipment part. In order to make maximum use of the limited space of the sales stand housing it is therefore provided that, in the equipment part, magazines with bobbins are arranged which are extracted from the magazine by a single-extraction device and put into the lift device. This lift device overcomes the height difference between the lower equipment part and the storage slots arranged in the upper part customer array part. The bobbins in the bottom lift of the lower lift device are transported vertically inside the housing in the bobbin lift on the rear side of the housing and are then transferred to a second bobbin lift in the XY transport system at about the level of the division between the upper and lower parts.

In this way the depth of the housing is optimally used in that the XY transport system only operates the given system of coordinates; only a slight extension of depth (Z-direction) is necessary for reasons of construction.

Thus an automatic filling of the storage slots is ensured, it only remains to make the bobbin optically readable to inform the drive system of the XY transport system into which storage slot the thus identified bobbin must be placed.

A particularly simple embodiment form of XY transport system exists in that it consists of a bobbin lift accepting in each case at least one bobbin and which is drivable in the Y-direction and which is slidably mounted in a carriage which is drivable in the X-direction.

In this way it is possible to reach every optional filling opening of the row-and-column arranged filling slots. A particularly simple motor drive of the XY transport system arises in accordance with the subject of claim 4 in that the motor drive is achieved by one single drive motor which drives by a capstan drum a first drive wire both ends of which are attached to corresponding attachment points on the bottom lift. A second part is a mirror-image of the first wire with reference to the longitudinal axis of the carriage and whose ends are attached to attachment points one above the other on the carriage, and the complete wire arrangement crosses over the carriage in the form of an X and is fixed to it by the end points.

A requirement for the control of the XY transport to optimal points in the XY-plane is that two brake systems can be controlled by the drive of one wire. One brake system is assigned to the bottom lift in the carriage which restrains the bobbin lift against movement in the carriage when this is to be moved in the X-direction, and the other brake system is assigned to the carriage itself which is restrained on guide rails fixed to the housing if a movement of the bobbin lift is necessary in the Y-direction.

The described sales stand preferably has a storage capacity of between 500 and 1000 bobbins depending on the sort, which, when filled are, according to experience, sufficient for two seeks supply without any storage slot in the sales stand having to be refilled. In a preferred embodiment example, bobbins of three different diameters are used, namely reels of 12 mm, 19 mm and 41 mm diameter.

The subject of the present invention arises not only from the subject of the individual patent claims but also from the combination of the individual patent claims one with another. All the details and features disclosed in the documents particularly those arising from the drawings illustrating the layout are claimed as being essential to the invention, in so far as they are, either individually or in combination, new as compared to the state of the art.

In the following the invention will be further described by means of drawings illustrated merely one embodiment example. Here arise from the drawings and their descriptions further features and advantages to the invention.

BRIEF DESCRIPTION OF THE SEVERAL VIEWS OF THE DRAWINGS:

FIG. 9. Side view of the guidance of the carriage of the XY transport system.

FIG. 10. View in direction of arrow X on the carriage illustrating its upper guidance.

FIG. 11. Detailed view of the arrangement of the brake magnets for the braking system seen in the direction of arrow X1 in FIG. 9.

FIG. 12. Plan view of the braking system in the direction of arrow X11 in FIG. 9.

DETAILED DESCRIPTION

Figure 1:
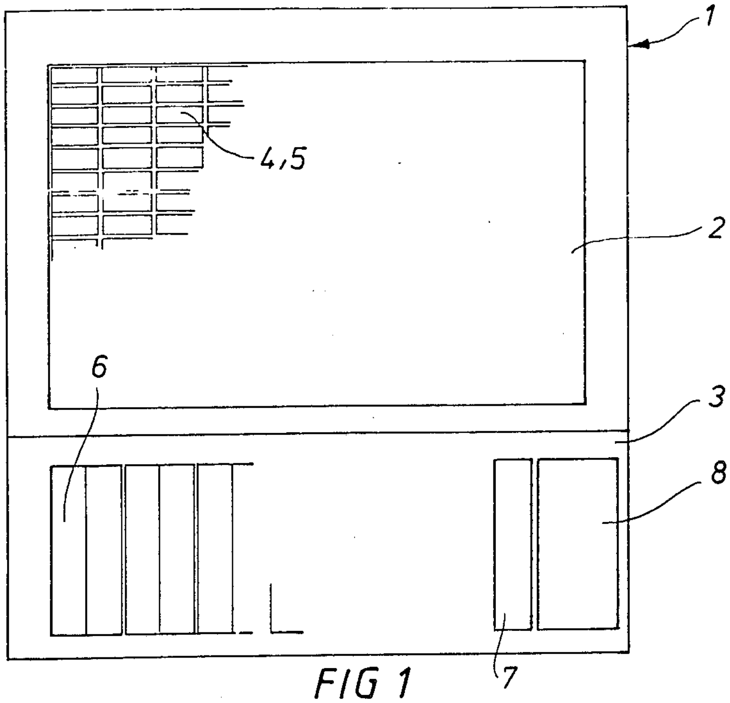
FIG. 1. Front view of a sales stand with schematically illustrated details.
Figure 3:
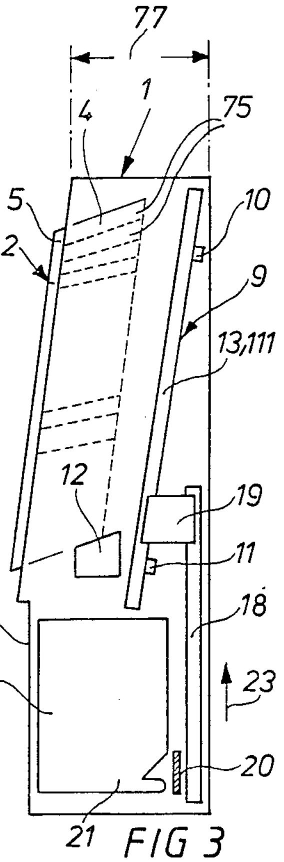
FIG. 3. Schematic section through a sales stand in accordance with FIG. 1.

In accordance with FIGS. 1 and 3, the housing (1) is divided into an upper customer array part (2) and a lower equipment part (3). The customer array (2) consists of a plurality of storage slots (4) arranged in rows and columns, the front of each slot opening into a removal opening (5). In order to ensure a better removal, the front plate of the customer array (2) is slightly tilted in a rearwards direction in accordance with FIG. 3.

Each storage slot (4) is slightly tilted about its longitudinal axis, forwards in the direction of the removal opening (5) (Ref. FIG. 3), so that the bobbins loaded through the rear filling opening (75) can roll forwards through the storage slot towards the removal opening (5).

The equipment part (2) of the housing (1) consists of bobbin magazines (6) arranged in parts, a reject bin (7) and an electronic system (8).

In the bobbin magazines (6) are unsorted bobbins of different shades and thread consistencies where, however, each bobbin magazine only contains one size of bobbin.

Bobbins rejected during single-selection and sorting procedures as not to be delivered for automatic filling, are ejected into a reject bin (7).

The electronic system (8) contains all the electronic elements for the control of the XY transport system (9).

Figure 2:
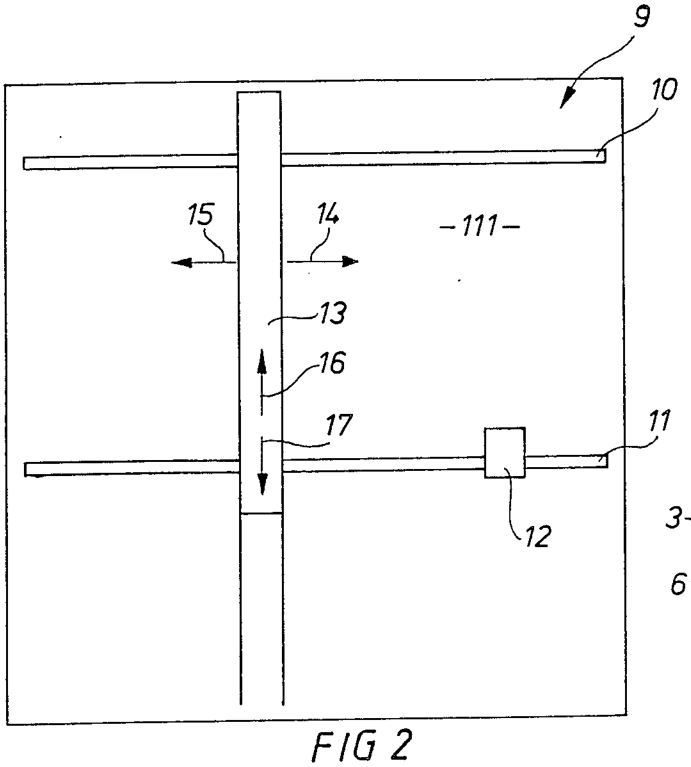
FIG. 2. Schematical functional diagram of the XY transport system.

The XY transport system shown in plan view in FIG. 2 and in side view in FIG. 3 consists mainly of a plate (111) fixed to the housing whose plane is secured parallel to the plane of the rear side filling openings (75) of the storage slots (4) in the housing (1) of the sales stand. On the mounting plate (111) guide rails (10)(11) running horizontally and parallel are equidistantly secured, and on these guide rails slides a carriage (13) in the direction of arrows (14)(15) (X-direction).

Figure 5:
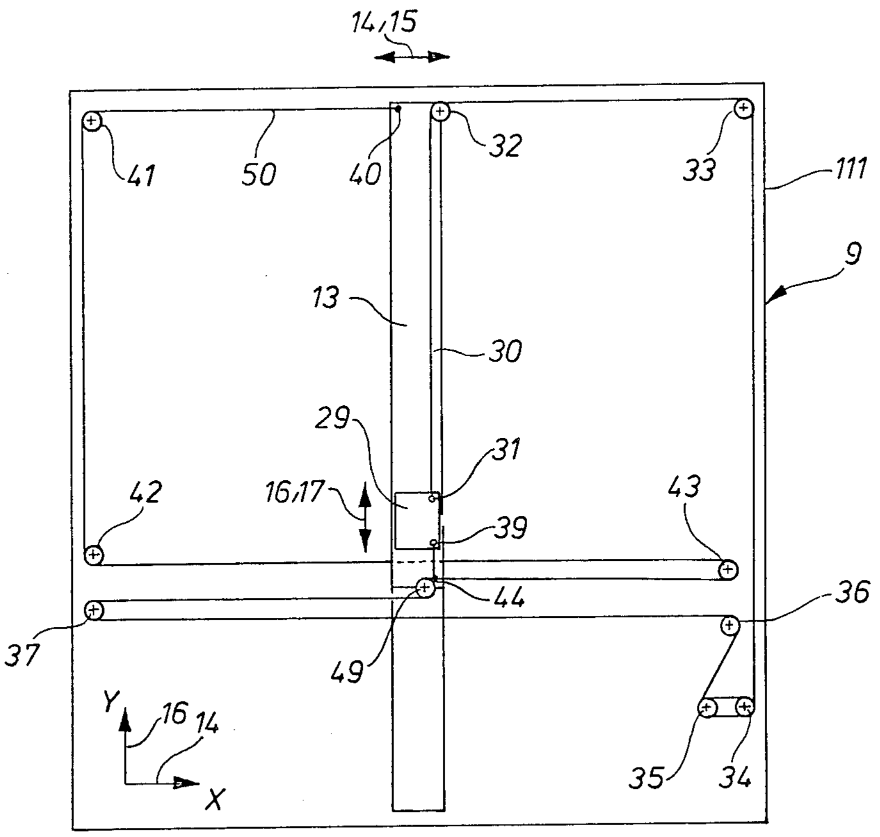
FIG. 5. The arrangement of the drive wire for the XY transport system in plan view.

In the carriage (13) a bobbin lift (29)(Ref. FIG. 5) is mounted slidably in the Y-direction (arrow directions 16,17) in a manner to be further explained later, in which the bobbin lift (29) accepts the bobbin which is to be transported to the filling opening (75) of the respective storage slot (4) by means of the XY transport system.

It is important that the XY transport system (9) only lays claim to a minimum depth (77) of the housing (1).

Figure 4:
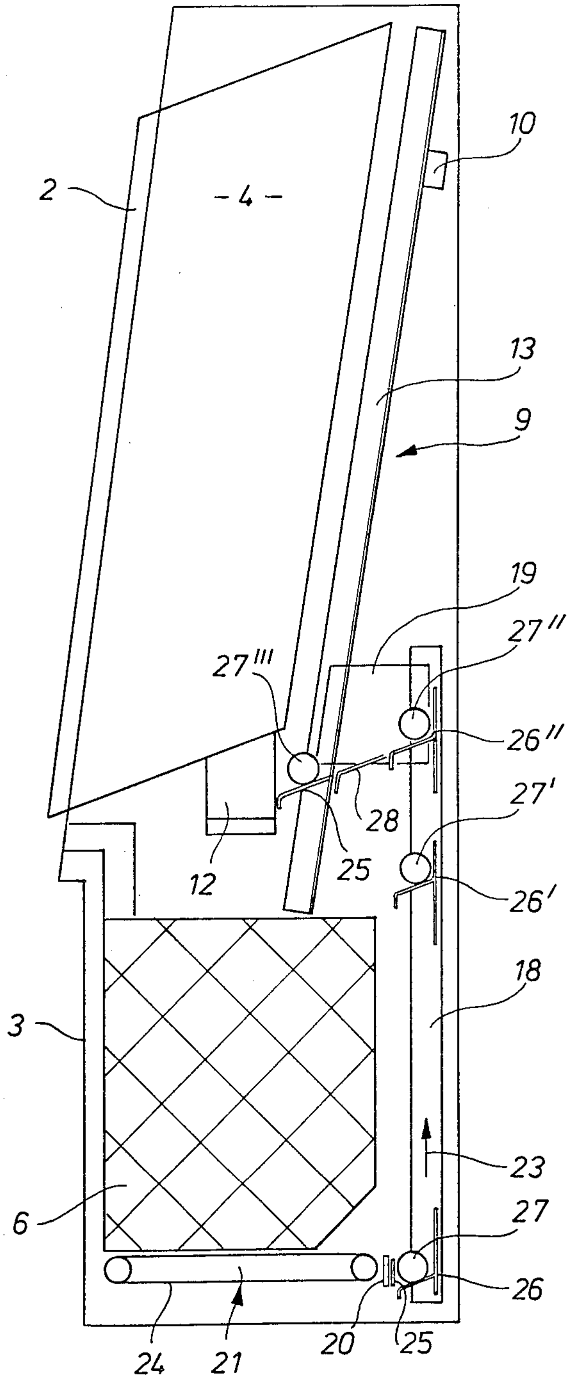
FIG. 4. Section as in FIG. 3 illustrating further details.

Using FIGS. 3 and 4, the automatic filling by means of the XY transport system (9) will be breifly described.

The bobbins arranged in the magazine (6) are extracted through a lower outlet in the magazine by a single-selection device (21) which mainly consists of a conveyor belt (24) which transports the extracted bobbin firstly through a thread trap (20) which detects if a loose thread is hanging from the bobbin or not. If a loose thread is detected then the bobbin is not transferred to the subsequent transport system.

The transport system arranged after the thread trap (20) consists, according to FIG. 4, of a lower bobbin lift (26) in a lifting device (18) which moves reciprocally in arrow direction (23), the bobbin lift gripping the bobbin (27) between the jaws (25). After accepting the bobbin (27) in the position in FIG. 4 the bobbin lift (26) moves upwards in the direction of arrow (23)(position 26′, 27′) to reach the position (26″, 27″), its upper final position.

There are jaws (25) of the lifting device (18) open and the bobbin (27′) rolls down a tilted ramp (28) in the region of a transfer device (19) into the barcode reader (12) on the other side of the ramp (28) where the bobbin is identified by the barcode markings on the bobbin flange.

After identification of the bobbin in the barcode reader (12) the bobbin is brought into its position (27') on the bobbin lift (29) of the transport system (9) by a drive system which is not further described and is held there by jaws which are not further described.

The XY transport system (9) now carries out the automatic filling of the storage slots (4) through the rear filling openings (75) corresponding to the control input signals of the electronic system (8). Each storage slot is allocated a specific XY identity and the barcode reader (12) has identified the bobbins according to size, type and colour of material. The control part receives the signals which determine into which storage slot the bobbins (27''') are to be delivered by the transport system (9).

The function of the XY transport system (9) will now be further described by means of FIGS. 5 to 15.

The XY transport system (9) consists mainly of the carriage (13) which is slidable in arrow directions (14)(15) by means of pulleys further illustrated in FIG. 9, in the plane of a corresponding plate (111)(Ref. FIG. 2). The carriage therefore moves in the X-direction.

In the carriage (13) a bobbin lift (29) is slidably mounted in the Y-direction (arrow directions 16, 17). The respective bobbin is retained in the bobbin lift (29) by jaws which are not further described, and—when the bobbin lift (29) lies opposite the filling opening (75) of the selected storage slot (4)—is ejected and thus falls into the storage slot.

The movement of the XY-direction is achieved by a wire drive which consists of two independently secured wires (30)(50). Wire (30) goes from an attachment point (31) on the bobbin lift (29) vertically upwards parallel and opposite to the carriage (13) and then over a pulley (32) secured to the carriage (13) at upper right horizontally to a pulley (33) secured to the plate (111) and then vertically downwards and over a pulley (34) and from there around an adjacent pulley (35) and again back to the pulley (34). The number of turns of the wire around the pulleys (34) and (35) is two and a half.

Figure 6:
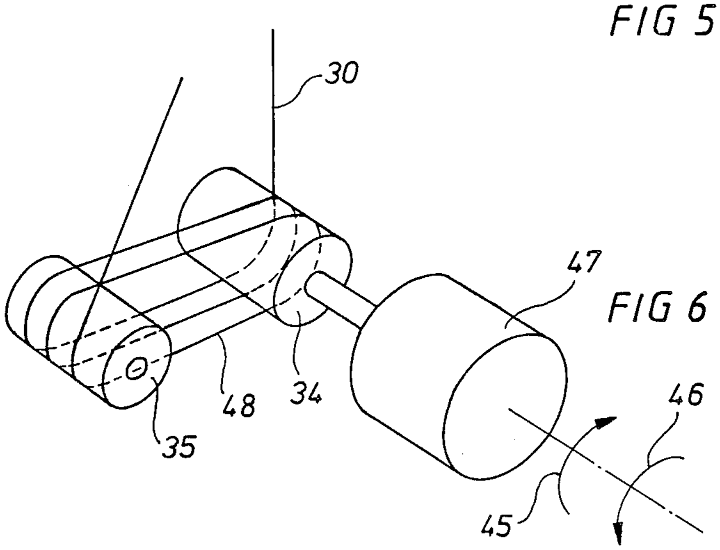
FIG. 6. An enlarged detail of the wire drive system.

In accordance with FIG. 6, the pulley (34) also forms the drive pulley for the wire (30) in which the pulley (34) (capstan drum) is connected to the drive motor (47) by a shaft which can be rotationally driven in either arrow direction (45) or (46).

The two and a half wrap-around about the pulleys (34) and (35) serves to avoid a possible slippage of the wire during drive from the drive motor (47).

Subsequent to the pulley (35) the wire is led over the pulley (36) secured to the plate (111) in which the pulley (36) is arranged above and midway between the two pulleys (34)(35).

Subsequent to diverting around pulley (36) the wire runs in a horizontal direction to a pulley (37) attached on the left edge of the plate (111), from which it runs horizontally back to a pulley (49) secured to the carriage (13) and then the wire runs vertically upwards to a fixed attachment point on the bobbin lift (29). The wire is therefore secured to the bobbin lift (29) at the attachment points (31)(39).

The second wire (50) goes from attachment point (40) on the upper left corner of the carriage (13) horizontally to a pulley (41) secured to the upper left corner of the plate (111) and from there vertically downwards to a lower pulley (42) on the plate (111) which diverts the wire (50). From there the wire (50) runs horizontally to the pulley (43) secured to the upper right edge of the plate (111). After diversion around this pulley (43) the wire (50) runs horizontally to an attachment point (44) on the carriage (13). The attachment points (31)(39)(44) are in a vertical line.

By means of the selected wire drive, consisting of two wires (30) (50) and the single drive from the drive motor (47) in conjunction with two independent braking systems, it is possible to bring the bobbin lift (29) to any optional position in the area of the surface delineated by the pulleys (33)(41)(42)(43).

Figure 7:
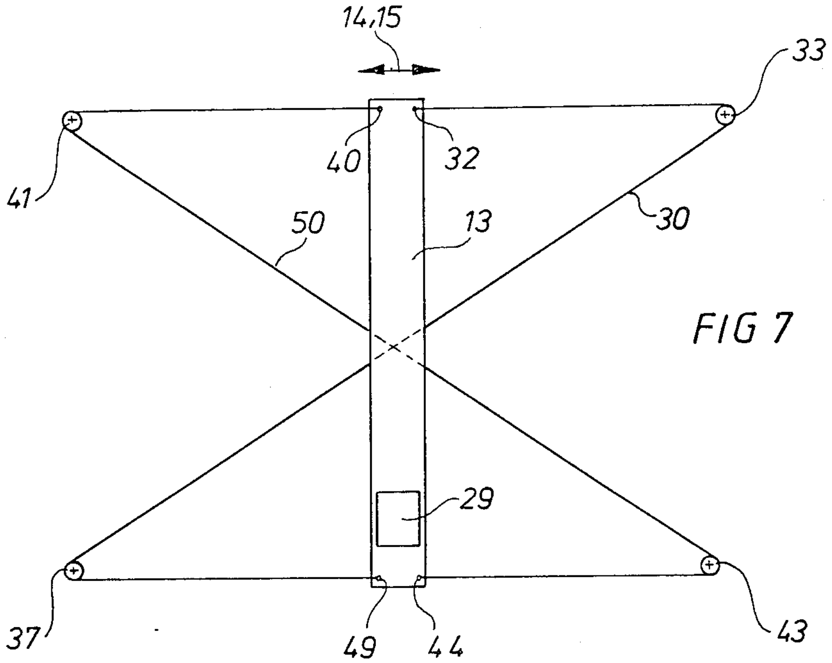
FIG. 7. Schematic illustration of the drive wire guidance during movement in the X-direction.
Figure 8:
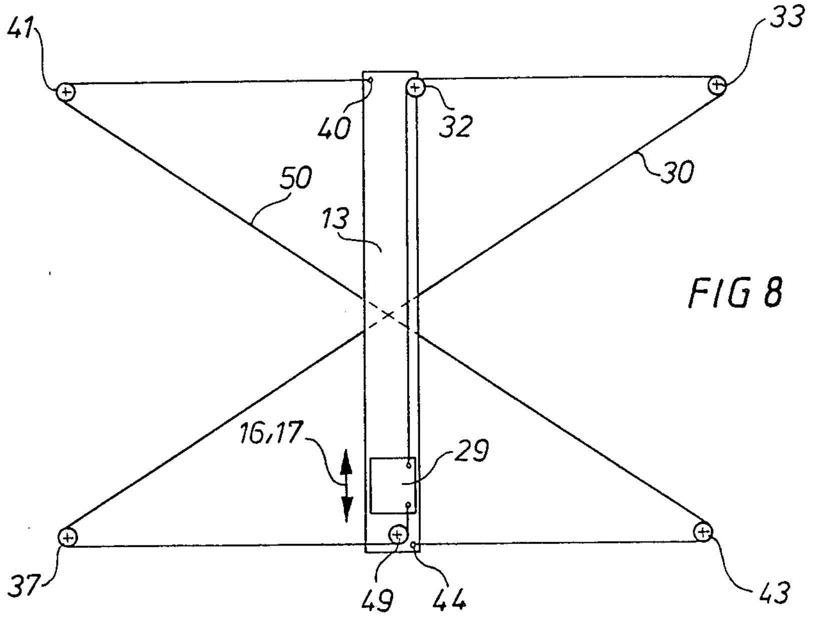
FIG. 8. Schematic illustration of the drive wire guidance during movement in the Y-direction.

The exact function of the system arises from FIGS. 7 and 8.

Figure 13:
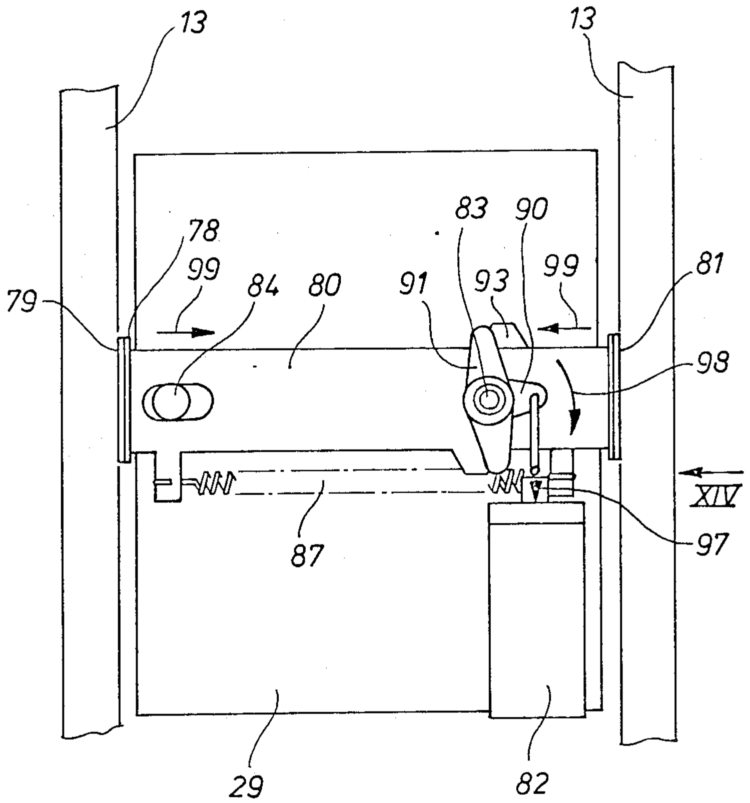
FIG. 13. Plan view of the braking system for the bottom lift in the carriage.
Figure 14:
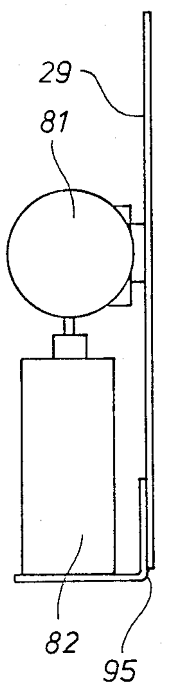
FIG. 14. Side view in the direction of arrow X1V in FIG. 13.
Figure 15:
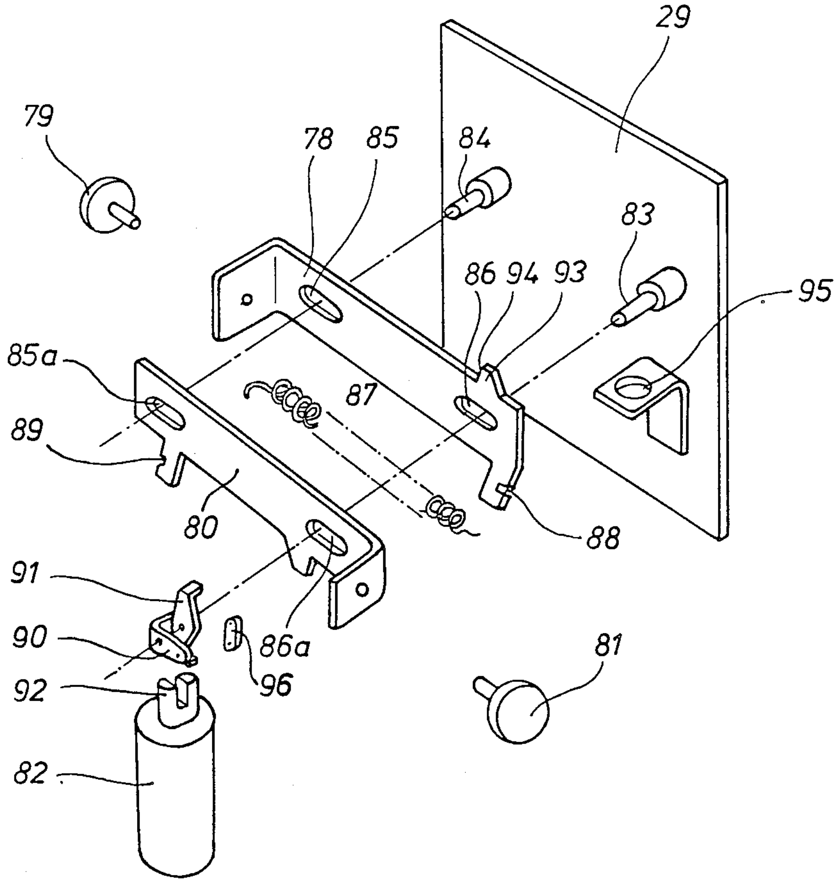
FIG. 15. Perspective illustration of the braking system in accordance with FIGS. 13 and 14 in exploded view.

It is shown in FIG. 7 that the bobbin lift (29) is restrained in the carriage by the brakes illustrated in FIGS. 13 to 15, i.e. it cannot move in the Y-direction. For reasons of simplicity the wire drive for movement in the Y-direction can now be omitted. If the drive motor (47) is now driven in the direction of arrow (45), the carriage (13) is now moved to the left in arrow direction (15). A rotation of the drive motor (47) in the direction of arrow (46) moves the carriage to the right in the direction of arrow (14).

FIG. 8 shows the Y-direction movement. For reasons of simplicity the wire for the movement in the X-direction has been left out. The carriage (13) is restrained on the plate (111) by the braking system illustrated in FIGS. 9 to 12. The bobbin lift (29) brake is released so that it is free to move in the carriage (13).

A rotation of the drive motor (47) in arrow direction (45) causes a movement upwards in arrow direction (16) of the bobbin lift (29) whereas a reverse rotation of the drive shaft of the drive motor (47) in the direction of arrow (46) causes a downwards movement of the bobbin lift (29) in direction of arrow (17).

The guidance of the carriage (13) in the guide rail (10)(11) fixed to the housing and the braking system of this carriage will now be further explained by means of FIGS. 9 to 12.

The guide rails (10)(11) are secured to the plate (111) which is attached to the housing. The upper guidance for movement of the carriage (13) in the X-direction is achieved, in accordance with FIGS. 9 and 10, in that the guide rails (10) secured to the housing is formed as a "T" section on whose "T"-leg two guide rollers (52) roll which are rotatably mounted on a trolley (56). The trolley (56) is itself rotatably connected by pivot point (57) to the carriage (13).

In this way the upper part of the carriage (13) is pivotable in the pivot point (57) relative to the upper guide rail (10) so that changes in load conditional on position changes of the carriage (13) are well compensated for.

The mounting of the lower part of the carriage (13) in the guide rail (11) secured to the housing is achieved, in accordance with FIGS. 9 and 12 in that, on an attachment angle (112) which is connected to the lower part of the carriage (13), two parallel pins are arranged at a specific distance from each other, which engage in corresponding guide rollers (53)(54) which abut sideways the "T"-leg of the lower guide rail (11).

Pivot mounted on each respective pin is one end of each respective brake lever (62)(63) in which each brake lever (62)(63) is connected on its inner face relative to the "T"-leg, to each brake pad (60)(61) respectively.

The pivoting of both brake levers (62)(63) in the bearing points (58)(59) in direction of arrows (66)(67) is now achieved, in accordance with FIG. 11, in that on the other end of the brake lever (62)(63) recesses are provided into which engages each respective pin (64)(65) which is connected to a brake plate (72) moveable in arrow directions (73)(74).

Each of the lifting rods (70)(71) engages flexibly with a respective brake solenoid (68)(69) on the opposing sides of the brake plate (72).

The upper brake solenoid (68) is, for example, responsible for the released position of the brakes whereas the lower brake solenoid (69) engages the brakes.

To disengage the brakes the upper brake solenoid (68) is energized during which the lower brake solenoid (69) is de-energized.

The brake plate (72) is thus moved upwards in the direction of arrow (73). Both pins (64)(65) which are arranged slightly tilted on the brake plate (72) are moved apart and the brake levers (62) (63) are pivoted outwards in the direction of arrows (66)(67) about their bearing points (58)(59), thus the brake pads (60)(61) are lifted from the side guide faces of the "T"-leg of the guide rail (11).

In reverse fashion the brakes are applied by energizing the lower brake solenoid (69) and the upper brake solenoid (68) being then de-energized. In this way the brake plate (72) is moved downwards in arrow direction (74) and the slightly outwards-tilted pins (64) (65) allow the brake levers (62)(63) to carry out a pivoting movement in the opposite direction to arrow directions (66)(67) in which the brake pads (60)(61) abut the side surfaces of the "T"-leg of the guide rail (11), thus the carriage (13) is firmly connected to the guide rail (11). In this brake position the bobbin lift (29) moves in the Y-direction.

In the following the brake system for the bobbin lift (29) will now be described, which is applied when the carriage (13) is to make a movement in the X-direction.

The bobbin lift (29) is here mounted slidably in the Y-direction (arrow directions 16,17) between two guide rails of the carriage (13), by guide rollers which are not further explained.

To restrain the movement of the bobbin lift (29) between the guide rails of the carriage (13), the brake system illustrated in the FIGS. 13 to 15 is provided.

In accordance with FIG. 15 the bobbin lift (29) is fitted with two parallel pins (83)(84) at a specific distance from each other, which, by means of corresponding and aligning slots (85)(85*a*) or (86)(86*a*) engage through the brake plates (78)(80). By means of the slots (85)(85*a*) and (86)(86*a*) the brake plates (78)(80) are slidable in the arrow direction (99) and in the opposite direction (Ref. FIG. 13).

Each brake plate (78)(80) has an angle piece on one end, each of which is connected to a brake pad (79)(81).

On the opposite end, relative to the angle piece, of each respective brake plate (78)(80) are lower tabs with notches (88)(89) formed in them. In each notch (88)(89) engages the end of a spring (87) which holds both brake plates (78)(80) in the retracted position, in which the brake pads (78)(81) are lifted off the guide surfaces of the guide rails of the carriage (13).

The sliding movement of the brake plates (78)(80) is achieved in that on a bracket (95) connected to the bobbin lift (29) a solenoid (82) is attached whose armature (92) is formed on its upper end as a U-shaped bearing piece, which accepts in the U, two rotatable levers (90)(91) which are vertical to each other and rigidly connected. The levers (90)(91) are rotatably mounted on pin (83) of the bobbin lift.

The armature (92) is rotatably connected to one end of a connection piece (96), whose other end engages the free pivoting part of the lever (90).

If the solenoid (82) in accordance with FIG. 13 is now energized, the armature (92) moves downwards thus pivoting the lever (90) in the direction of arrow (98). This causes the lever (91) to contact a flank (94) which is part of the projection (93).

In this way, a relative movement occurs between the lever (91) and the projection (93) because the lever slides along the flank (94). Thus the brake plates (78)(80) each carry out a sliding movement in arrow direction (99) by which the brake pads (79)(81) are lifted from the guide rails of the carriage (13). Thus the bobbin lift (29) is free to move in the carriage (13) in the Y-direction.

If the solenoid is de-energized the brake pads (79)(81) grip the guide rails of the carriage (13) under the action of the springs (87).

The brake pads (79)(81) always centralize themselves under the action of the spring and distribute their braking force evenly on both opposite sides of the guide rails of the carriage (13).

The optical reader system for control of the XY transport system will now be further explained by means of FIGS. 16 to 19.

The storage slots (4) are all together in a box which is carried on rails (100)(101) which are secured to the housing. On the underside of the right rail (101) a control rail (102) is attached which is illustrated in the plan view in FIG. 11. The control rail (102) has alternate control projections (103) and control recesses (104) in which one impulse width exactly corresponds to the width (105) of a storage slot (4).

Figure 16:
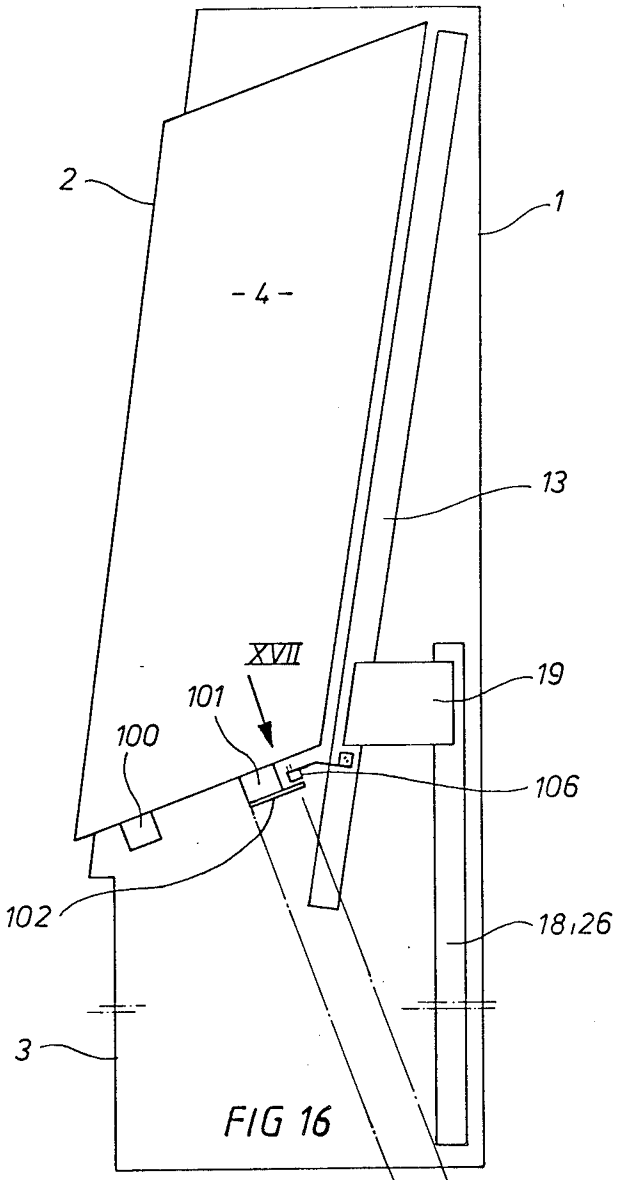
FIG. 16. Side view of the housing illustrating the control rails for optical reader system for control of the transport system in the X-direction.
Figure 17:
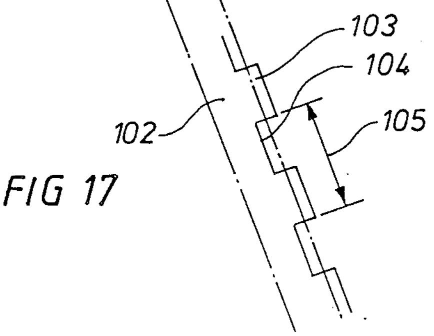
FIG. 17. Plan view of the control rails according to FIG. 16.

In accordance with FIG. 16, a detector (106) is fitted to the carriage (13) by a retaining arm, this detector thus lies in an opposing position to the control projections and control recesses (103)(104) of the control rail (102).

As an alternative to the control projections and recesses (103) (104), optically readable light and dark marks or magnetic markings can be used.

The detector (106) is a part of the optical reader and is, for example, according to the light barrier principle, built up as a light barrier or as a reflection light barrier.

A movement of the carrier (13) in the X-direction then gives the detector (106) exact readable information, as an impulse width of the control markings (103)(104) exactly corresponds to the width (105) of the storage slot (4).

Figure 18:
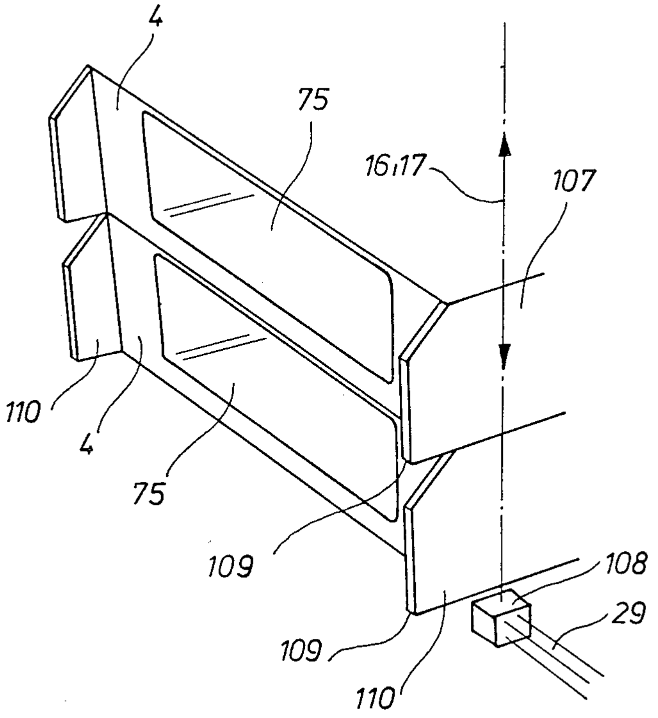
FIG. 18. Perspective side view of the storage slots illustrating a control rail in the Y-direction.
Figure 19:
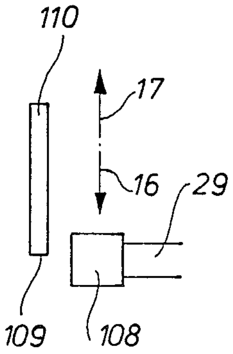
FIG. 19. Front view of the control rails according to FIG. 18.

The reader system in the Y-direction consists of, in accordance with FIGS. 18 and 19, a control rail (110) secured on each side wall (107) of the storage slots (4) which has, facing the rear face of the housing (1), recesses of a type such as that each recess is limited by a sharp control edge (109). A detector (108) secured to the bobbin lift (29) is therefore driven in the Y-direction (arrow directions 16,17) together with the bobbin lift along the control rail (110) and thus registers each control edge (109)(Ref. FIG. 19) whereby the spacing of the control edge (109) corresponds, approximately, to the exact height of a storage slot (4) so that the filling opening (75) of the respective storage slot is exactly defined.

The detector (108) is again, a part of the optical reader system.

The control signals generated by the detectors (106)(108) are directed to the control system which controls both braking systems and the drive motor (47).

The control system is so designed that, by the switching on of the complete drive system, the carriage (13) with its bobbin lift (29) takes up, for example, the extreme lower right position whereby an exactly defined start point is always given.

After input of the corresponding XY co-ordinates the carriage (13) immediately drives rapidly to just before the desired X-position and then drives very slowly to achieve its exact X-position. The carriage (13) is then stopped on the assigned guide rail of the housing by its braking system and the bobbin lift (29) is released and drives rapidly to just before its desired Y-position. It then crawls to reach its final Y-position. After achieving the corresponding XY-position, the bobbin (27) retained in the bobbin lift (29) by a retaining system, which is not further explained, is inserted into the desired filling opening (75) directly opposite the bobbin lift (29). The bobbin then rolls down the storage slot (4) to the removal opening (5) in the front, where it is ready for removal.

An advantage of the described XY transport system is the minimal space requirement, the low production costs and the safe method of operation. An increase in the height of the housing is not necessary and the depth of the housing must be only slightly increased because—on account of the inclined position of the customer array (2)(Ref. FIG. 4 and 16)—the lower lifting device (18) can be arranged beneath the inclined XY transport system (9) and thus the housing depth must be only slightly enlarged around the depth of the very narrowly-built XY transport system.

What we claim is:

1. A sales stand for sewing thread bobbins and the like comprising:

- a housing having a front and a back, and an upper portion and a lower portion;
- a plurality of storage slots in said housing arranged in rows and columns with their longitudinal axes parallel, each slot having a removal opening at the front and a filling opening at the back for receiving a number of the same bobbins which can be removed from the removal opening at the front;
- means for automatic filling of the storage slots through the rear filling opening, including an XY transport system mounted for movement parallel to the plane of the filling openings which comprises a carriage which is mounted for movement in the X direction along said back, a first bobbin lift mounted on said carriage for movement in the Y direction for receiving at least one bobbin and depositing it in a filling opening of a selected storage slot; and
- means for selectively depositing a bobbin into the first bobbin lift of the transport system comprising a bobbin storage magazine, a vertically movable second bobbin lift mounted on the back of the housing for receiving a single bobbin from said magazine, dispensing means for dispensing a single bobbin at a time from said magazine to said second bobbin lift for transfer to the first bobbin lift of the XY transport system.

2. A sales stand in accordance with claim 1 wherein: said means for automatic filling of the slots further comprises common drive means for said carriage and said first bobbin lift comprising a wire having both ends operatively connected to the bobbin lift, and a drive motor drivingly engaging said wire.

3. A sales stand in accordance with claim 2 wherein: means for enabling movement of the XY transport system in the X-direction comprising brake means for restraining movement of the bobbin lift on the carriage.

4. A sales stand in accordance with claim 2 wherein: said drive means further comprises braking means on said carriage for restraining movement of said carriage for enabling said drive means to move said first bobbin lift in the Y direction on said carriage.

5. A sales stand in accordance with claim 2 wherein: said drive means comprises a second wire, which is a mirror image of the first wire with reference to the longitudinal axis of the carriage, and is secured at both ends to corresponding opposing attachment points on the carriage and the complete wire arrangement crosses over itself in the form of an X.

6. A sales stand in accordance with claim 5 wherein: said drive means further comprises means for movement of the first bobbin lift in the Y-direction comprising an electro-magnetic braking system which restrains said carriage while allowing free movement of said first bobbin lift on said carriage.

7. A sales stand in accordance with claim 5 wherein: means for enabling movement of the XY transport system in the X-direction comprises brake means for restraining movement of the bobbin lift on the carriage.

8. A sales stand in accordance with claim 1 wherein: position control of the XY transport system comprises a first control rail directed in the X-direction and a second control rail at right angles to said first control rail directed in the Y-direction, wherein each rail is secured to the housing, and wherein the first control rail provides position indicating means for an optical detector attached to the carriage and the second control rail provides position indication means for an optical detector attached to the bobbin lift.

9. A sales stand for sewing thread bobbins and the like comprising:

- a housing having a front and a back, and an upper portion and a lower portion;
- a plurality of storage slots in said housing upper portion arranged in rows and columns with their longitudinal axes parallel, each slot having a removal opening at the front and a filling opening at the back for receiving a number of the same bobbins which can be removed from the removal opening at the front;
- means for automatic filling of the storage slots through the rear filling opening, including an XY transport system mounted for movement parallel to the plane of the filling openings which comprises an upper and a lower guide rail extending horizontally across the back of said housing, a carriage mounted for movement in the X direction along said guide rails, a first bobbin lift mounted on said carriage for movement in the Y direction for receiving at least one bobbin and depositing it in a filling opening of a selected storage slot, common drive means for said carriage and said first bobbin lift comprising a wire having both ends secured to corresponding attachment points on the bobbin lift, and a drive motor drivingly engaging said wire; and means for selectively depositing a bobbin into the first bobbin lift of the transport system comprising a bobbin storage magazine, a vertically movable second bobbin lift mounted on the back of the housing for receiving a single bobbin from said magazine, dispensing means for dispensing a single bobbin at a time from said magazine to said second bobbin lift for transfer to the first bobbin lift of the XY transport system.

10. A sales stand in accordance with claim 9 wherein: said drive means further comprises braking means on said carriage for restraining movement of said carriage for enabling said drive means to move said first bobbin lift in the Y direction on said carriage.

11. A sales stand in accordance with claim 10 wherein:

means for enabling movement of the XY transport system in the X-direction comprises brake means for restraining movement of the bobbin lift on the carriage.

12. A sales stand in accordance with claim 11 wherein:

position control of the XY transport system comprises a first control rail directed in the X-direction and a second control rail at right angles to said first control rail directed in the Y-direction, wherein each rail is secured to the housing, and wherein the first control rail provides position indicating means for an optical detector attached to the carriage and the second control rail provides position indication means for an optical detector attached to the bobbin lift.

* * * * *